B. M. W. HANSON.
METAL SCREW MACHINE.
APPLICATION FILED APR. 25, 1914.

1,140,325.

Patented May 18, 1915.
3 SHEETS—SHEET 1.

Witnesses:

Inventor:
B. M. W. Hanson
by ........., Att'y.

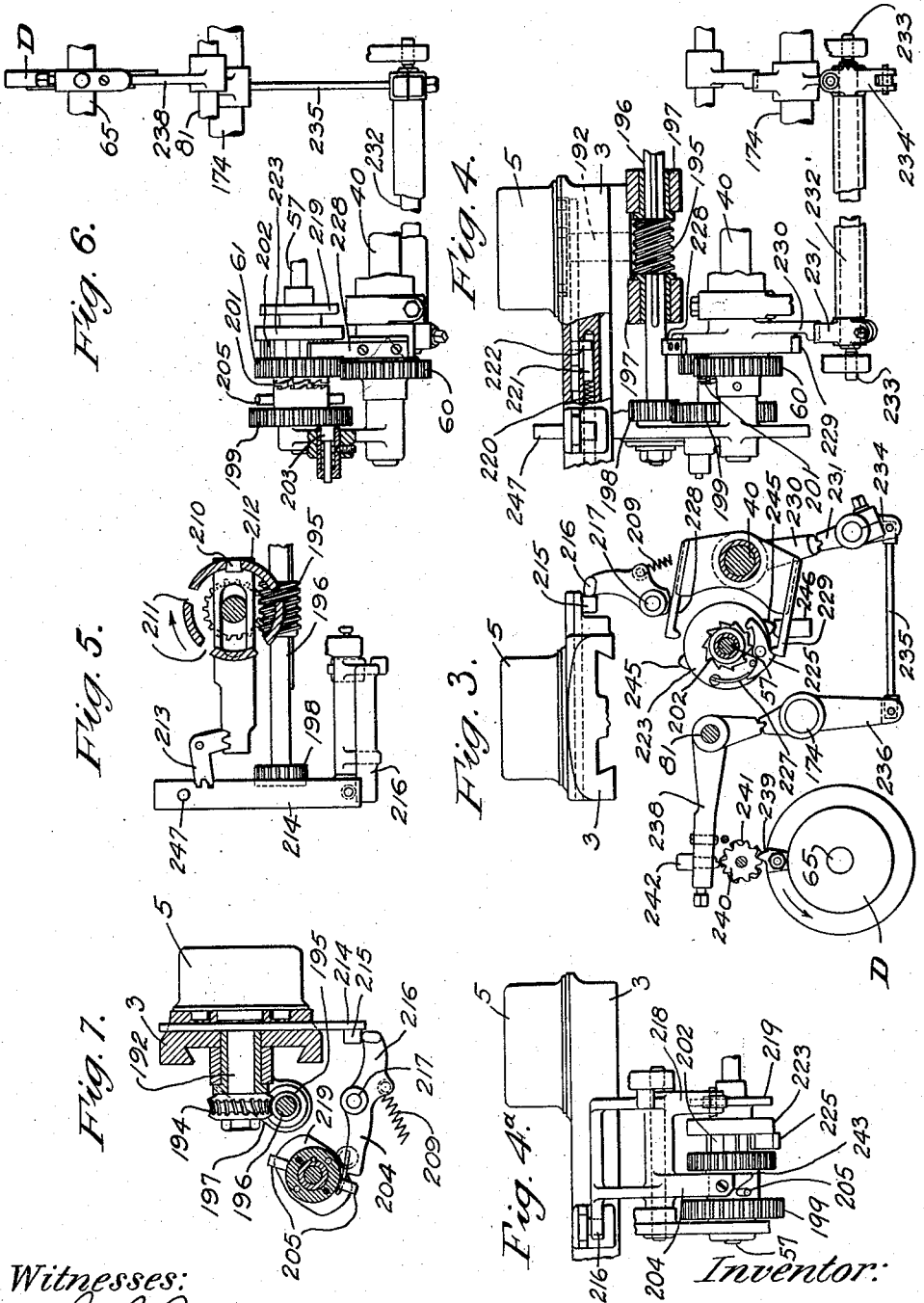

B. M. W. HANSON.
METAL SCREW MACHINE.
APPLICATION FILED APR. 25, 1914.
1,140,325.
Patented May 18, 1915.
3 SHEETS—SHEET 3.
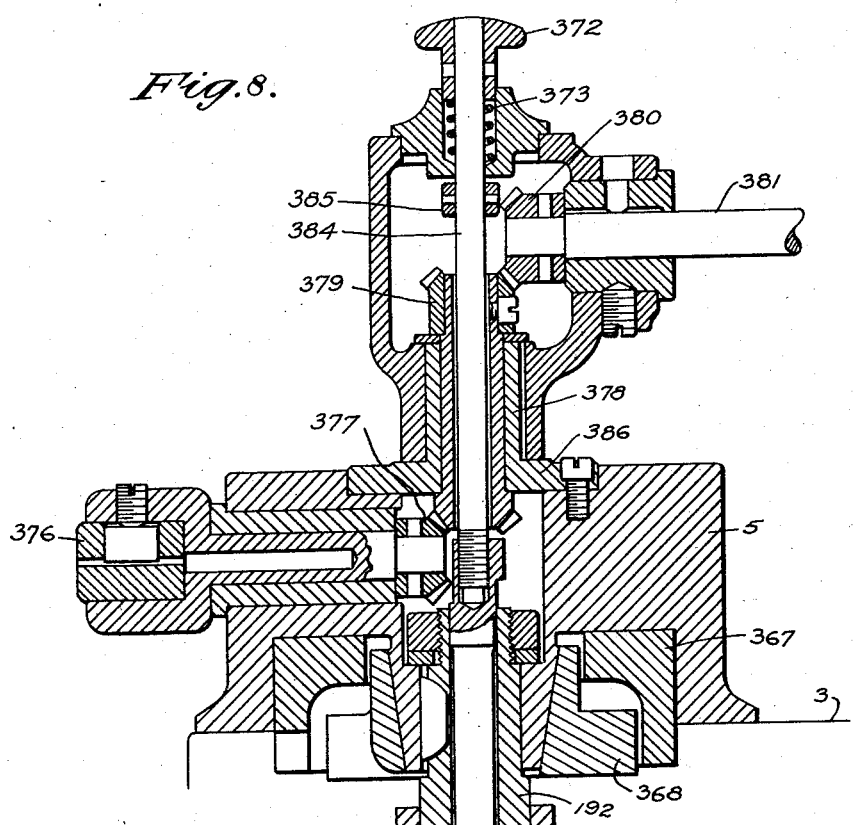
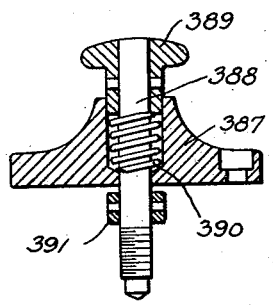
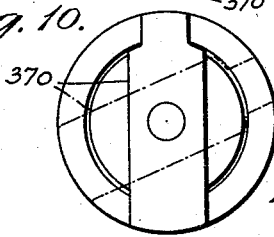
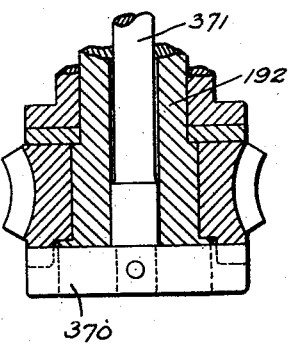
Witnesses:
Inventor:
B. M. W. Hanson
by
Atty.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-SCREW MACHINE.

1,140,325.   Specification of Letters Patent.   Patented May 18, 1915.

Original application filed April 7, 1910, Serial No. 553,965. Divided and this application filed April 25, 1914. Serial No. 834,323.

*To all whom it may concern:*

Be it known that I, BENGT M. W. HANSON, a citizen of the United States, residing at Hartford, in the county of Hartford and State of Connecticut, have invented new and useful Improvements in Metal-Screw Machines, of which the following is a specification.

This invention, although applicable to turret tool machines of various types, is herein shown in an embodiment suitable for machines of the type now generally known as automatic screw machines for making metal screws, studs, pins, and similar articles. In such machines a rod of stock is gripped by a chuck carried in a revolving spindle with a suitable length of the rod projecting beyond the length of the spindle. This projecting end is operated upon in succession by suitable tools mounted in the tool turret shown herein, which is revolved at the proper intervals to bring its succeeding tools into operative relation to the rod, and is fed forward at suitable times and at the proper speed for the effective operation of the respective tools. These turret tools turn the body and sometimes the head of the screw to their proper diameters, cut threads upon the body, shape the end of the screw, and otherwise complete it to the desired form, after which the screw or other piece of work is severed from the rod, which is then fed forward to project its new end to the required distance. The chuck is again closed and the turret tools repeat their operation.

This application is a division of my earlier application Serial No. 553,965 filed April 7, 1910.

Figure 1:
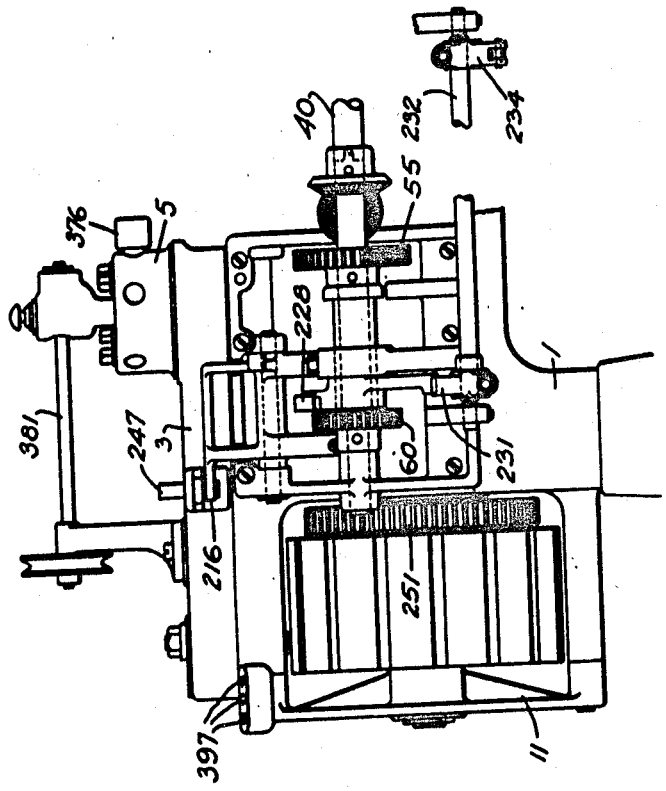
Figure 2:
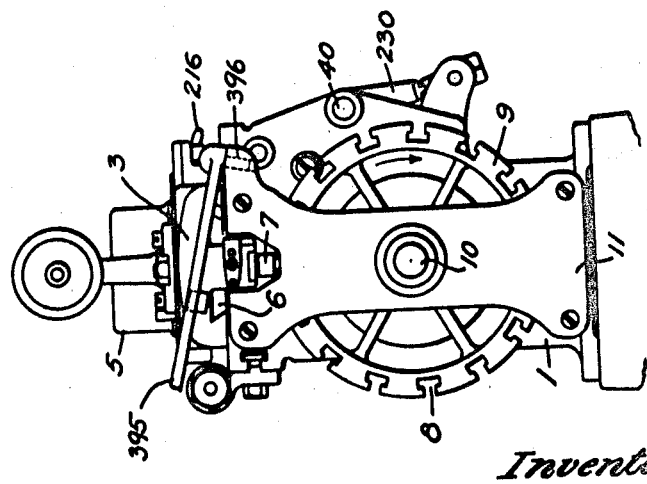

Figure 1 of the drawings is a side elevation and Fig. 2 an end elevation of that part of the machine which forms the subject of the present invention. Fig. 3 is an end view. Figs. 4 and 4ª are side views and Figs. 5 and 6 are plan views of the mechanism for controlling and operating the revolving turret, carrying the tools which operate upon the stock. Fig. 7 is an end view partly in section projected from Figs. 5 and 6. Figs. 8 to 11 inclusive represent the mechanism by which the turret may be released for turning it by hand independently of the automatic mechanism for that purpose. Fig. 8 is a front elevation in section taken through the vertical center of the turret. Fig. 9 is an elevation also in central longitudinal section projected from the lower portion of Fig. 8. Fig. 10 is an underneath view projected from Fig. 8. Fig. 11 is a side view in section taken through its longitudinal center, of a turret releasing device which may be employed upon the turret in place of that shown in Fig. 8, when no drilling attachment is employed.

In the preferred embodiment which is herein shown of the present invention the parts are mounted upon a bed or frame 1 which may be integral with or an extension of the main bed of the machine with which this turret mechanism is associated. The turret slide 3 is mounted on ways 6 to slide in a direction longitudinally of the main spindle of the machine, with which the turret tools are set in axial alinement. The rearward end of the turret slide is provided with an anti-friction roll 7 which engages with suitably shaped cam pieces clamped to T-slots 8 in the periphery of the cam wheel 9, which is fixed to the cam shaft 10. That shaft extends lengthwise of the bed, and is driven in suitable time relation to the rest of the mechanism, for example by the gear 251. At its rearward end it is preferably supported outside of the cam wheel 9 by means of a removable bracket 11 secured to suitable projections of the bed 1. For the cam wheel 9 and its cam strips I prefer to use the adjustable cam strip construction shown and described in my Patent No. 855,773 of June 7, 1907, which will not be described in detail herein.

The turret 5 is mounted for rotation on the turret slide 3. A sleeve 192 having its upper end firmly secured to the turret 5 is journaled in a vertical position in the turret slide 3, preferably within a bushing 193. Secured upon the lower end of the sleeve is a worm gear 194 which meshes with a worm 195 on a splined worm shaft 196, mounted on the bed of the machine. The worm is moved along the shaft with the turret slide, to keep it in mesh with its worm gear during the movement of the slide, by means of projections 197 which encircle the shaft 196 at the ends of the worm. The worm shaft 196 has fixed upon it a gear 198 which meshes with the gear 199 which is mounted to turn loosely on the shaft 57.

The end of the hub of the gear is notched to form a clutch face 201 which engages with the similar face of the hub of the gear 61, which is also mounted to turn loosely upon the shaft 57. The gear 61 is driven constantly by the gear 60 on the shaft 40, and has fixed upon its side face the ratchet wheel 202. A spring pressed plunger 203, mounted in the bed and bearing against the side face of the gear 199, tends to push the clutch face 201 into engagement with its coöperating clutch face of the gear 61. The clutch faces are forced apart against the pressure of the spring plunger by the beveled end of an arm 204 appurtenant to the turret locking and unlocking mechanism, which engages with one or the other of the clutch pins 205 projecting from the gear 199. (See Figs. 4ª and 7.) The operation of this mechanism will be further described in connection with the turret locking and unlocking mechanism, with which it is intimately associated.

The turret when in its resting positions is locked against rotation on the turret slide, by means of a lock bolt 210, which is fitted to slide in the turret slide, and enters suitably spaced recesses 211 in a locking ring 212, appurtenant to the turret. The lock bolt 210 is connected by means of a toothed sector or arm 213, with a cross slide 214, which is fitted in the turret slide to slide transversely thereof, and is provided at its rearward end with a pin or antifriction roller 215, which bears against the face of an operating arm 216, which extends parallel with the turret slide a sufficient distance to remain in engagement with the roll 215 throughout the movement of the turret slide, thus enabling it to operate the turret lock at any position of the turret and slide. The operating arm 216 is supported for turning movement on the shaft 217, and is provided, in addition to the arm 204 already referred to, with a cam arm 218, which bears, by means of a suitable pin or antifriction roller, against the cam 219, mounted loosely on the shaft 57. The cam 219 is of a contour suitable for retracting the lock bolt 210 through the connections just described at each half revolution of the cam; and the cam contour is therefore duplicated on diametrically opposite portions of its periphery, as shown in Fig. 7. As a means for pushing the locking bolt to its closed position, a spring 220 is provided, preferably in the turret slide, bearing against a plunger 221, which in turn bears against a downwardly projecting pin or lug 222 of the locking bolt 210 (Fig. 4). A spring 209 attached between the arm 216 and any convenient portion of the frame holds the cam arm 218 against its cam 219, retracting the arm 216 from the turret locking devices carried by the slide, thus leaving the bolt free to shoot into the succeeding locking recesses 211. A half revolution is imparted to the cam whenever it is desired to unlock the turret, by means of intermittently operated mechanism shown in Figs. 3 and 4. Attached to the cam 219 is a disk or flange 223, upon the opposite face of which is pivotally mounted a dog 225, situated in the plane of the ratchet 202, with which the dog when released is pressed into engagement by means of the spring 227. The dog is released from the ratchet 202 and held out of engagement by means of the oppositely disposed detents 228 and 229, appurtenant to a rocking lever 230 mounted for rocking movement on the shaft 40 or on a suitable bushing or sleeve within which that shaft is journaled. The lower end of the lever has a toothed engagement with an intermediate lever 231, which is secured upon the end of the shaft 232 supported by the center 233, or in any other convenient way. The opposite end of that shaft has fixed upon it an arm 234 connected by means of the rod 235 with the lever 236 turning on the shaft or stud 174, and having a toothed engagement with the control lever 238 on the pivot shaft 81. The forward end of the control lever projects over and is operated by the control disk D, by means of a tappet 239 on the control disk D on the shaft 65, through the intervention of a star wheel 240 and cam 241, the star wheel being turned by the tappet 239 and the cam operating against the cam pin 242 to raise and lower the arm 238 alternately at succeeding rotations of the disk D. It thus serves to put in operation at the proper time the mechanism for rotating the turret, after the locking bolt is withdrawn, operating as to this function, in conjunction with the cam 219. When the control lever 238 is raised it operates through the connecting mechanism to raise the detent 228 and thus withdraw it from the dog 225, which, engaging with the ratchet 226, makes half a revolution, carrying with it the cam 219. As the operating arm 216 is moved by the cam to withdraw the locking bolt, its clutch arm, which at its lower end is beveled at 243 as shown in Fig. 4ª, is carried away from whichever one of the clutch pins 205 it may have been in engagement, thus releasing the gear 199 to the operation of the spring plunger 203, which thereupon pushes the clutch face 201 into engagement with the coacting clutch face of the gear 61, thereby rotating the turret through the gears 199 and 198, the worm 195, and the worm gear 194. When the desired partial rotation is complete, the contour of the cam 219 permits the operating arm 216 to return to the position shown in Fig. 7, thus bringing the beveled end 243 of the arm 204 into engaging relation to the succeeding clutch pin 205, thus moving the gear 199 endwise, and thereby detaching the clutch face 201 from the corresponding clutch face of the gear 61, stopping the rotation of the turret. The same movement of the arm permits the locking bolt 210 to be carried by its spring 220 into the succeeding locking notch 211 of the turret. Having thus completed its cycle of operation, the dog 225 is withdrawn by the detent 229, stopping the mechanism, to be again released by the next tappet 239 of the control disk D. The flange 223 is provided with backwardly facing teeth 245, which alternately engage with the spring plunger 246 to hold the mechanism in its resting position shown in Fig. 3, against the tendency of the spring 227 to retract that mechanism. The cross slide 214 is provided with a knob or handle 247 projecting through a slot in the top of the turret slide, or arranged in any other convenient way to enable the lock bolt 210 to be withdrawn by hand.

Means are provided for enabling the tool turret to be unlocked and rotated by hand, which is sometimes desirable in adjusting the machine to new pieces of work. As already described in connection with the locking mechanism, the cross slide 214 is extended through to the front of the turret slide, or is provided with a projecting knob or handle 247 which in this case is shown to extend upwardly through the top of the turret slide to a position where it may be conveniently reached by the hand of the operator, to enable him to withdraw the locking bolt 210. It is also generally necessary to disconnect the turret from the means for rotating it, which in this case includes the worm gear 194 and the worm 195.

In Figs. 8, 9 and 10 is shown an arrangement for positively and yet detachably connecting the turret with the driving worm gear 194. The latter is fitted to rotate freely upon the sleeve 192, which is journaled in a bushing 193 carried in a vertical position by the turret slide. The tool turret 5 is mounted upon the turret slide, being provided with suitable bushings 367 and 368 for firmly seating and centralizing the turret, so as to sustain it against the thrust of the work done by the tools, and also generally to enable it to be adjusted for taking up the wear. The upper end of the sleeve 192 is keyed or otherwise firmly secured to the turret. Positive but detachable driving engagement between the worm gear 194 and the sleeve 192 is provided by means of a dog or driver 370, which is fitted into a cross slot or channel extending across the lower face of the sleeve 192 and through the hub or flange of the worm gear 194. When the dog or driver is pressed into the bottom of this cross-slot it serves to lock the worm gear positively to the sleeve 192, to register or position the turret in its correct rotary relation to the coöperating elements of the machine. The dog is pinned or otherwise secured to the lower end of a rod 371 extending vertically through the sleeve 192 to the top of the turret, being there provided with a projecting knob 372. A spring 373 under the knob 372 or any other convenient portion of the rod serves to hold the dog 370 yieldingly into the bottom of its cross-slot, so as to connect the worm gear 194 and the turret sleeve together. But when the knob is pushed down against the pressure of the spring 373 the dog 370 is thereby pushed out of its slot far enough to clear the hub of the gear 194, thus enabling the turret to be turned by hand, whereupon the knob may be released as the dog will then occupy a position out of coincidence with its seat in the worm gear, as indicated by dot-and-dash lines in Fig. 10. Upon turning the turret completely around or otherwise bringing the slots into their former coincidence, the dog is pressed into place by its spring and again locks the turret and worm gear together. It is desirable to have the driving dog 370 extend all the way across, so as to engage with the worm gear at opposite sides of the center of rotation, so as to drive equally upon the two opposite sides. In doing so, however, it is important to prevent the dog from dropping into its locking position when the turret has made half a revolution, since this would lock the turret 180 degrees out of its proper operating position. For this reason the dog 370 is made of different widths at its opposite ends, or in some equivalent way adapted to match its driving seat in the worm gear at only one correct registering position, instead of two opposite positions.

In some instances it is desirable to employ a rotating drill chuck 376, or other rotating tool holder in the turret. Such an arrangement is shown in Fig. 8, adapted to accommodate the vertical connecting rod 371 for releasing the turret. The drill chuck 376 mounted for rotation in one of the tool holes of the turret is provided on its inner end with a beveled gear 377 meshing with teeth cut on the lower end of a connecting gear sleeve 378 journaled concentrically with the vertical axis of the turret. The upper end of this sleeve is connected by means of bevel gears 379 and 380 with a horizontal shaft 381, which connects by means of gearing or by a pulley and belt with any convenient driving shaft, from which rotary movement is thus communicated to the drill chuck 376 without interfering with the rotation of the turret, or interfering with the free operation of the turret releasing rod 371. That rod is preferably made in two disconnectible sections, connected by a screw thread, the upper section or extension 385 extending through the axial center of the gear sleeve 378, and having upon its upper end the knob 372. A stop collar 385 may be employed to limit the upward movement of the rod. This drilling mechanism may be made removable from the turret by mounting it upon a movable bracket having a flanged foot 386, seated in a corresponding recess in the top of the turret. When the drilling mechanism is not required the bracket may be removed and a cap 387 (Fig. 11) be substituted for it, having a shorter extension rod 388 which is screwed into the operating rod 371 in place of the longer extension 384. This extension rod may be provided with a knob 389, a spring 390 and a collar 391, like the corresponding appurtenances of the extension rod 384, and operating in exactly the same way. A hand lever 395 is preferably provided to enable the turret head to be operated by hand when required. The end of that lever is provided with a pivot pin 396 which may be inserted in any one of a series of pivot seats 397 on the bed or frame. (Figs. 1 and 2.) The lever rests upon and bears against the rearward end of the turret slide 3.

The cam shaft 10 carrying the cam 9 for moving the turret slide back and forth is driven from the associated mechanism, its time of starting and stopping being controlled by a control disk on the shaft 65 similar to the control disk D, through a control mechanism like that shown in Figs. 3, 4 and 6. Thus the turret slide mechanism is operated in synchronism or in suitable time relation to the rest of the machine.

In operation, the tappet 239, being set at the required position on the control disk D, that tappet advances the star wheel 240 and with it the cam 241, thus raising the arm 238 or lowering it, as the case may be, and thereby, through one of the detents 228 or 229 releasing the dog 225, and allowing it to engage with the ratchet wheel 202, thereby rotating the cam 219 and moving the operating arm 216 to withdraw the locking bolt 210 from the turret (Figs. 3 and 4ᵃ). The swinging movement of the arm 216 withdraws its lower end 243 from the pin 205, thus allowing the clutch 201 to close and start the train of gearing 198, 199 and the worm 195 in operation, turning the turret 5 through the desired angular distance to bring the next tool into its working position. The arm 216 after being moved forward to withdraw the bolt is returned at once by its spring 209 to its resting position, thus permitting the lock bolt 210 to enter the succeeding locking recess 211 in the bottom of the turret. The lower beveled end 243 of the arm 201 engaging with the succeeding pin 205 opens the clutch 201 and stops the rotation of the worm 195. By the same time the dog 225 has been withdrawn from the ratchet 202, thus also stopping the rotation of the cam 219. The parts rest in this position until the next operation of the tappet 239 which at its proper time again moves the control arm 238 and through it its associated mechanism, which repeats the operation above described.

For the sake of definiteness, the illustration and description of this invention are herein directed to a type of screw machine. It will be understood, however, that the invention may be greatly modified and adapted to other machines within the scope of the appended claims.

I claim as my invention:—

1. The combination, in a screw machine, of a tool carrying turret, a turret slide, locking devices carried with the turret, including an operating member movable transversely of the turret slide, an operating arm pivotally supported to swing transversely of the turret slide movement, and extending along the pathway of the said operating member, a multiple lobe cam for operating the said arm by partial revolution of the cam, and limited action clutch devices for imparting the said partial revolutions to the cam.

2. The combination, in a screw machine of a tool carrying turret, a turret slide, locking devices carried with the turret, including an operating connection movable transversely of the turret slide, an operating arm pivotally supported to swing transversely of the turret slide movement, and extending along the pathway of the said operating member, a multiple lobe cam for operating the said arm by partial revolution of the cam, limited action clutch devices for imparting the said revolutions to the cam, and a control device driven with the machine for governing the time of the said partial revolutions.

3. The combination, in a screw machine, of a tool carrying turret, a turret slide, locking devices carried with the turret, including a member movable transversely of the turret slide movement, a spring yieldingly holding the lock in its locking position, means for manually retracting the lock, and means for retracting the lock automatically, including an operating arm extending along the pathway of the said member, intermittently operating clutch mechanism for moving the said arm, and a control device for governing the time of the said clutch mechanism.

4. The combination, in a screw machine, of a tool carrying turret, a turret slide, locking devices carried with the turret, including an operating connection movable transversely of the turret slide, an operating arm pivotally supported to swing transversely of the turret slide movement, and extending along the pathway of the said operating member, intermittent driving mechanism for moving said arm, and a control device driven with the machine for governing the operation of the said driving mechanism.

5. The combination, in a screw machine, of a turret, means for rotating the turret in timed relation to the other parts of the machine, and a manually operable clutch connection registering the turret in a definite rotary relation to its rotating means, whereby the turret may be temporarily disconnected from its said rotating means and reconnected only in the same register therewith.

6. The combination, in a screw machine, of a tool carrying turret, turret rotating mechanism, a detachable driving connection between the turret and its rotating means, and a manually operated connection convenient to the hand of the operator for detaching the said connection to enable the turret to be rotated manually in either direction.

7. The combination, in a screw machine, of a tool carrying turret, mechanism for intermittently rotating the turret from one operating position to another, means for locking the turret in its said operating positions, and means for manually disconnecting the turret from its rotating and locking devices, to enable it to be turned in either direction by hand, independently of said mechanisms.

8. The combination, in a screw machine, of a tool carrying turret, mechanism for rotating the turret, including a driving member mounted concentrically with the turret, normally in constant engagement therewith, and a manually detachable clutching member connecting the turret and the said driving member.

9. The combination, in a screw machine, of a tool carrying turret, mechanism for rotating the turret, including a driving member mounted concentrically with the turret, a detachable clutch member, connecting the turret with its said driving member, and a manually operated connection extending from the said clutch member axially through the turret to a position convenient to the hand of the operator.

10. The combination, in a screw machine, of a tool carrying turret, turret rotating mechanism, including a gear journaled for rotation concentrically with the turret, a detachable clutch member for effecting driving engagement between the said turret and its gear, and a manually operated connection for said clutch member extending axially through the turret to a position convenient to the hand of the operator.

11. The combination, in a screw machine, of a tool carrying turret, mechanism for intermittently rotating the turret, including a worm gear, rotatably journaled upon an axial extension of the turret, a clutch member for effecting driving engagement between the turret and the worm gear, and a manually operated connection for the clutch member extending axially through the turret into convenient relation to the operator.

12. The combination, in a screw machine, of a tool carrying turret, a tool rotatably mounted in the turret, a rotating driving connection for the said tool mounted concentrically with the turret, intermittent rotating mechanism for the turret, including a driving member mounted for turning movement concentrically with the turret, a clutch member for effecting driving connection between the turret and its rotating mechanism, and a manually operable connection for the clutch member extending axially through both the turret and the said rotating connection.

13. The combination, in a screw machine, of a turret slide, a tool carrying turret mounted thereon, intermittent rotating mechanism for the turret, including a worm gear mounted concentrically with the turret, a worm carried by the slide, a detachable clutch member for effecting driving connection between the turret and the worm gear, and a manually operable connection for the said clutch extending axially through the turret to a convenient position for the operator.

14. The combination, in a screw machine, of a turret slide, a tool carrying turret mounted thereon by means of a sleeve journaled in the turret slide, a tool rotatably mounted in the turret, a rotating driving connection for the said tool journaled concentrically with the turret on the side thereof opposite to the said sleeve, means for intermittently rotating the turret, including a gear rotatably mounted on said sleeve, a clutch member for effecting driving engagement between the worm gear and the sleeve, and a manually operable connection for the said clutch member extending axially through the said sleeve, and through the said rotating driving connection for the tool.

15. The combination of a turret, turret rotating mechanism, and turret unlocking mechanism, including a cam and cam arm for operating the turret unlocking mechanism, and another arm movable with said cam arm for inaugurating the operation of the turret rotating mechanism.

16. The combination of a turret, turret locking mechanism including a swinging frame provided with members for moving the turret unlocking mechanism, and for holding the turret rotating mechanism out of operation, and a cam for moving said frame to unlock the turret and release the turret rotating mechanism.

17. The combination, with a rotating and reciprocating turret, of mechanism for unlocking, rotating and relocking the turret at any portion of its reciprocating movement, including lock operating means extending parallel with the reciprocating movement of the turret, and a clutch device controlled by the said locking and unlocking mechanism for starting and stopping the turret rotating mechanism in proper time relation.

18. The combination of a turret, a reciprocating slide on which the turret is mounted for rotation, and intermittently operating mechanism for unlocking, rotating and relocking the turret at any position in its reciprocating movement, including a clutch device, a lock operating arm extending alongside the path of movement of the slide, and connecting means for releasing the said mechanism to rotate the turret when the latter is unlocked.

19. The combination of a turret, a reciprocating slide on which the turret is mounted for rotation, turret locking and unlocking mechanism, turret rotating mechanism, and coöperating clutch devices for operating and correlating the two said mechanisms at any position of the reciprocating slide, including a lock operating arm extending alongside the turret slide, and a clutch device controlled by said arm for starting and stopping the turret rotating mechanism.

20. The combination of a turret, a reciprocating carrier upon which the turret is mounted for rotation, turret locking and unlocking mechanism, turret rotating mechanism, and coöperating clutch devices between the two said mechanisms for operating and correlating them at any part of the reciprocating movement of the turret, including a lock operating arm extending alongside the pathway of the carrier, provided with means for putting the turret rotating mechanism in operation, a cam for moving the said unlocking member, and an adjustable control device for correlating the operations of the said mechanism to other associated mechanisms.

21. The combination of a turret, a cam and intermediate means for unlocking and relocking the turret, a clutch, and intermediate means for rotating the turret when unlocked, intermittent driving devices for the said cam and the said clutch, and a turret unlocking member moved by the said cam, and controlling the said clutch, to release the clutch and start the turret rotating mechanism when moved by the said cam.

In testimony whereof I have signed my name to this specification in the presence of two subscribing witnesses this 21st day of April, 1914.

BENGT M. W. HANSON.

Witnesses:
KATHRYN T. M. O'CONNELL,
CAROLINE M. BRECKLE.